US012703401B2

(12) United States Patent
Honkanen et al.

(10) Patent No.: US 12,703,401 B2
(45) Date of Patent: Aug. 11, 2026

(54) OPERATIONAL DESIGN DOMAIN MANAGEMENT FOR AUTOMATED VEHICLES

(71) Applicant: Einride AB, Stockholm (SE)

(72) Inventors: Dennis Honkanen, Stockholm (SE); Christian Larsson, Stockholm (SE)

(73) Assignee: Einride AB, Stockholm (SE)

( * ) Notice: Subject to any disclaimer, the term of this patent is extended or adjusted under 35 U.S.C. 154(b) by 109 days.

(21) Appl. No.: 18/388,839

(22) Filed: Nov. 11, 2023

(65) Prior Publication Data

US 2024/0157980 A1 May 16, 2024

(30) Foreign Application Priority Data

Nov. 11, 2022 (EP) .................................... 22207003

(51) Int. Cl.
*B60W 60/00* (2020.01)

(52) U.S. Cl.
CPC .... *B60W 60/0059* (2020.02); *B60W 60/0055* (2020.02); *B60W 2555/20* (2020.02)

(58) Field of Classification Search
None
See application file for complete search history.

(56) References Cited

U.S. PATENT DOCUMENTS 10,828,999 B1 11/2020 Konrardy et al.
2021/0114616 A1* 4/2021 Altman ................. H04W 76/15
2021/0312375 A1 10/2021 Khasis
2022/0135079 A1* 5/2022 Ito .......................... B60Q 1/507 701/23

OTHER PUBLICATIONS

Search Report And Written Opinion dated Apr. 17, 2023 received in European Patent Application No. EP 22207003.9.

* cited by examiner

*Primary Examiner* — Justin S Lee
(74) *Attorney, Agent, or Firm* — SCULLY, SCOTT, MURPHY & PRESSER, P.C.

(57) ABSTRACT

A method including: determining, based at least in part on plural data items originating in plural distinct sources, at least one estimated driving condition for each one of a plurality of road segments in a road network, each of the at least one estimated driving condition being determined for a future time interval; determining at least one route in the road network for a vehicle which includes a first road segment with a first estimated driving condition, determined for a first time interval, which satisfies a driving condition restriction for an automated system or automated feature of the vehicle, for an at least partially automated mode of the vehicle; and scheduling instructions for the vehicle including the at least one determined route such that the vehicle is capable of traversing the first road segment during the first time interval.

17 Claims, 5 Drawing Sheets

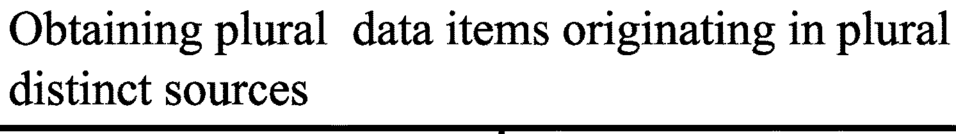

520

Determining, based at least in part on the data items, at least one estimated driving condition for each one of a plurality of road segments in a road network, each driving condition being determined for a future time interval

530

Determining at least one route in the road network for the vehicle which includes a first road segment with a first estimated driving condition, determined for a first time interval, from the at least one estimated driving condition, which meets the driving condition restriction for the vehicle

540

Scheduling the vehicle on the road network usingt one of the at least one determined route such that the vehicle traverses the first road segment at the first time interval

FIG. 5

OPERATIONAL DESIGN DOMAIN MANAGEMENT FOR AUTOMATED VEHICLES

CROSS-REFERENCE TO RELATED APPLICATION

This application claims priority under 35 U.S.C. § 119 to European Patent Application No. EP 22207003, filed on Nov. 11, 2022. The entire disclosure of European Patent Application No. EP 22207003 is incorporated by this reference.

FIELD

The present disclosure relates to automated vehicles capable of operating in an automated or supervised automated driving mode.

BACKGROUND

Automated vehicles are configured to move around, for example on roads, with reduced human supervision compared to traditional vehicles, which have a driver in the vehicle. In some cases automated vehicles may even drive themselves without human supervision. Such vehicles may use sensor data to assist in navigation and the task of maintaining the vehicle on the road until a destination is reached.

Vehicles with automated capabilities may be configured with restrictions as to conditions in which they are enabled to operate automatedly. For example, in case weather conditions are adverse, automated operation may be difficult to achieve without compromising safety. A defined set of conditions where a vehicle may operate automatedly may be referred to as an operational design domain, ODD.

SUMMARY

According to a first aspect of the present disclosure, there is provided a computer implemented method for route planning for a vehicle with automated driving capabilities, the computer implemented method comprising: obtaining a driving condition restriction for an automated system or automated feature of the vehicle which defines at least one set of acceptable conditions for operating the vehicle in an at least partially automated mode; obtaining plural data items originating in plural distinct sources; determining, based at least in part on the plural data items, at least one estimated driving condition for each one of a plurality of road segments in a road network, each of the at least one estimated driving condition being determined for a future time interval; determining at least one route in the road network for the vehicle which includes a first road segment with a first estimated driving condition, determined for a first time interval, which satisfies the driving condition restriction for the at least partially automated mode of the vehicle; and scheduling instructions for the vehicle including the at least one determined route such that the vehicle is capable of traversing the first road segment during the first time interval.

According to a second aspect of the present disclosure, there is provided a road transport system for route planning for a vehicle with automated driving capabilities, the road transport system comprising: a control system comprising at least one processor configured to: obtain a driving condition restriction for an automated system or automated feature of the vehicle which defines at least one set of acceptable conditions for operating the vehicle in an at least partially automated mode; obtain plural data items originating in plural distinct sources; determine, based at least in part on the plural data items, at least one estimated driving condition for each one of a plurality of road segments in a road network, each of the at least one estimated driving condition being determined for a future time interval; determine at least one route in the road network for the vehicle which includes a first road segment with a first estimated driving condition, determined for a first time interval, which satisfies the driving condition restriction for the at least partially automated mode of the vehicle; and schedule instructions for the vehicle including the at least one determined route such that the vehicle is capable of traversing the first road segment during the first time interval.

According to a third aspect of the present disclosure, there is provided a non-transitory computer readable medium having stored thereon a set of computer readable instructions for route planning for a vehicle with automated driving capabilities, where the set of computer readable instructions, when executed by at least one processor, cause the at least one processor to at least: obtain a driving condition restriction for an automated system or automated feature of the vehicle which defines at least one set of acceptable conditions for operating the vehicle in an at least partially automated mode; obtain plural data items originating in plural distinct sources; determine, based at least in part on the plural data items, at least one estimated driving condition for each one of a plurality of road segments in a road network, each of the at least one estimated driving condition being determined for a future time interval; determine at least one route in the road network for the vehicle which includes a first road segment with a first estimated driving condition, determined for a first time interval, which satisfies the driving condition restriction for the at least partially automated mode of the vehicle; and schedule instructions for the vehicle including the at least one determined route such that the vehicle is capable of traversing the first road segment during the first time interval.

BRIEF DESCRIPTION OF THE DRAWINGS

FIG. 5 is a flow graph of a method in accordance with at least some embodiments of the present disclosure.

DETAILED DESCRIPTION

Methods described herein employ data from sensors to determine estimated, or predicted, driving conditions for road segments. These estimated driving conditions may relate to lighting conditions, rain, snow or traffic congestion, for example. These estimated driving conditions are then used in scheduling the movements of at least one automated vehicle, for example an automated or semi-automated vehicle, taking into account configured restrictions concerning driving conditions in which the scheduled automated vehicle can operate. This enables using the vehicle with an enhanced utilization rate. In addition to sensor data, also supplementary information relating to, for example, weather forecasts or pedestrian density may be employed in determining the estimated driving conditions. In general, data items used in determining estimated driving conditions may include one or more of: sensor data items, items of supplementary information and/or items of model data.

Figure 1:
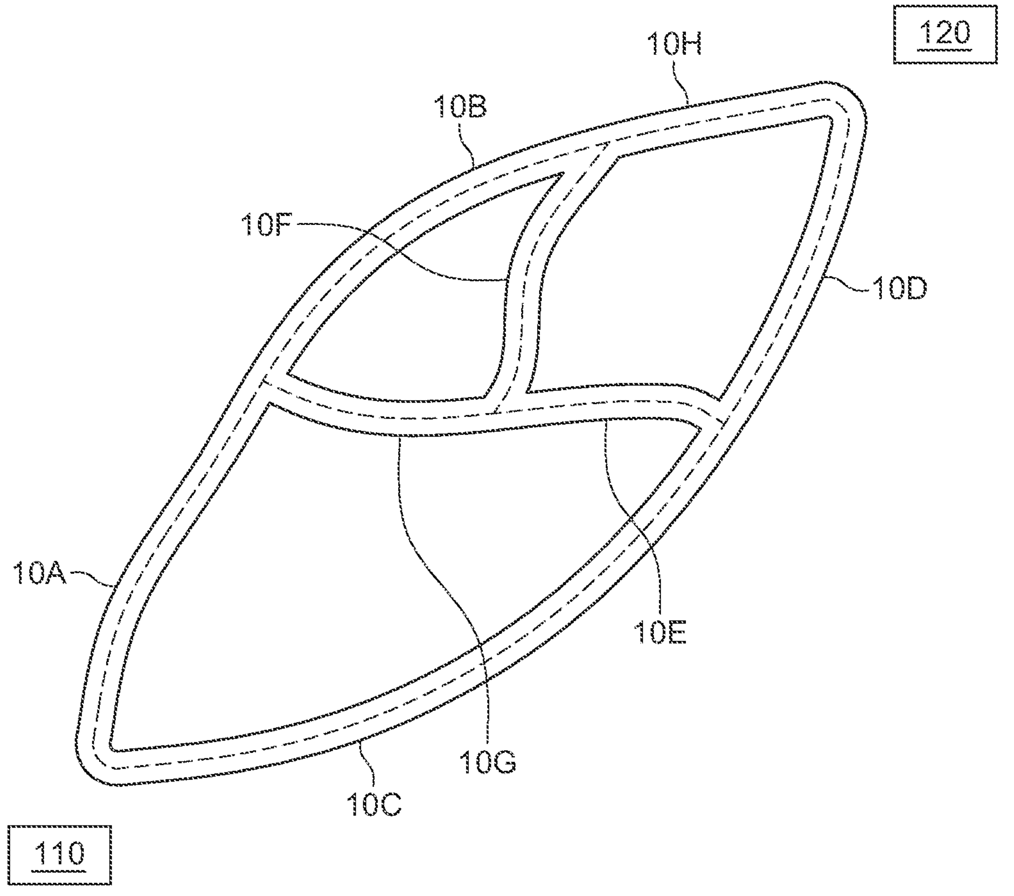
FIG. 1 illustrates an example scenario for illustrating at least some embodiments of the present disclosure.

FIG. 1 illustrates an example scenario for illustrating at least some embodiments of the present disclosure. This simplified illustration has a start point 110 and destination 120, which are connected to each other by a road network comprising road segments 10A, 10B, 10C, 10D, 10E, 10F, 10G and 10H. Real-life road networks are often more complex, the simple road network of FIG. 1 is used for clarity of the illustration.

Vehicles as referred to herein include: automated cars, trucks, heavy duty trucks, tractors, trailers, driverless vehicles, tracked vehicles or other land based vehicles used for logistics or transportation. Automated vehicles as referred to herein include vehicles with at least one automated system, automated feature, automated driving mode, semi-automated driving mode, remote operated driving mode, supervised automated driving mode, remote supervised automated driving mode and which, under at least one set of criteria are capable of at least partially controlling the steering, braking and/or acceleration of the vehicle without direct human input. Automated vehicles as referred to herein also include vehicles which are configured to and/or are capable of driving themselves at least part of the time without human intervention. These vehicles may be configured to be driven by a human driver under certain circumstances and may have a driver on board, or may be remotely operated from a remote driving station, for example.

The Society of Automotive Engineers, SAE, has defined a six-level division of driving automation extent in automated driving systems, ADS, as follows: at level zero, the human driver performs all driving tasks such as steering, acceleration and braking. At level one, the vehicle has a single automated system for one driving task, such as cruise control to partially control the speed. At level two, the vehicle is configured to perform steering and acceleration while the human driver monitors all tasks and is able to take control at any time. At level three, the vehicle can detect environmental conditions and perform most driving tasks, but a human driver is still able to take control at any time. At level four ADS, the vehicle is configured to perform all driving tasks, however with restrictions as to a geographic area where this is allowed, and conditions, such as driving conditions, where automated operation is permitted. Human override capacity is optional. Finally at level five ADS, the vehicle can perform all driving tasks without restrictions as to driving conditions, and human monitoring of the vehicle is not needed. The driving condition restrictions of level four ADS, or other driving condition restrictions, may be referred to as operational design domain, ODD, restrictions. ODD restrictions can also be found in other ADS levels. Additionally, there are multiple levels of Advanced Driver Assistance Systems, ADAS, which may have ODD restrictions. Still yet, a vehicle may include multiple ADS, ADAS or a combination thereof. Each system can have one or more ODD restrictions. Furthermore, a combination of two or more systems may have its own ODD restrictions which is separate from or based on the ODD restrictions of the individual systems within the combination.

Driving condition restrictions, for example, in ADS level four systems, may be set to ensure safety of the automated vehicle while operating in an automated, semi-automated or supervised automated mode as well as for other vehicles, property and/or pedestrians. For example, in case the automated vehicle cannot reliably be predicted to identify pedestrians in low light situations, or in heavy rainfall, this vehicle may be restricted as to its driving conditions such that it may not operate automatedly in heavy rain, or in darkness such as at night or in tunnels. Likewise, a vehicle may lack algorithmic capability to recover from aquaplaning, where a layer of water separates a tyre from the road surface. Such vehicles may be restricted to driving automatedly only when the road is dry.

Driving condition restrictions may also be based on political and/or geographic lines. For example, a government authority in one city, county, state or country may allow operation for a given vehicle under certain circumstances while a neighbouring government authority allows operation for the same vehicle under a different set of circumstances. In other words, safety requirements may vary between regions. It can also be that different types of roads or areas may have different allowed/permitted driving condition restrictions for a given vehicle. For example, on Class 1/A roads one set of driving condition restrictions applies and on Class 2/B roads another set of driving condition restrictions apply.

As can be seen from some of the non-exhaustive examples above, a vehicle may have more than one ODD restriction or driving condition restriction. Due to this, route planning and scheduling can become major factors in the utilisation and efficiency of a vehicle having ADS and/or ADAS systems on board.

Assigning driving tasks to automated vehicles, known as scheduling the automated vehicles, may be based at least partly on driving conditions which are estimated and/or predicted to prevail in different parts of a road network at certain times or time intervals. As an example, a vehicle should not be assigned a task of driving a route in case driving conditions along the route, when traversed by the vehicle, are not compliant with driving condition restrictions of the vehicle or its active systems. The vehicle does not traverse all segments of the route at the same time, wherefore all road segments need not comply with the driving condition restriction at the same time, e.g., when the vehicle starts out on a route, rather, the road segments of the route need to comply with the driving condition restriction when the automated vehicle is traversing them or expected to be traversing them. Thus, heavy rain at a last road segment of the route, which would contravene a driving condition restriction, does not prevent the automated vehicle from starting off in case the rain is credibly predicted to end before the vehicle reaches the last road segment of the route. An assigned driving task may include a starting location, a starting time, one or more planned stops, one or more optional stops, one or more charging breaks, one or more time or location gates, a destination location, a destination time, an ending time, the destination, a route to take to reach the destination or a combination thereof, for example.

As an example, it is possible to assign a vehicle an automated driving task at a moment or across a time interval when at least one road segment which is included in a route of the driving task has driving conditions which contravene the driving condition restrictions of the automated vehicle, if for example the estimated driving conditions for that road segment indicate that by the time the vehicle is predicted to enter the road segment, and during a time the vehicle is scheduled to traverse the road segment, its driving conditions no longer contravene the driving condition restrictions.

In the situation of FIG. 1, automated vehicles from start point 110 may reach destination 120 using several different route options. For example, a route comprising segments 10A, 10B and 10H, or a route comprising segments 10C and 10D. Estimated driving conditions may be determined for each of road segments 10A, 10B, 10H, 10C and 10D, and an automated vehicle may be assigned a task to drive to destination 120 from start point 110 such that the vehicle's driving condition restriction is respected, assuming the estimated driving conditions are correct. When determining the estimated driving conditions for a road segment, the conditions may be estimated for a specific time interval, to enable building an estimate of the driving conditions experienced by an automated vehicle when traversing the route, taking into account the speed at which the vehicle can move along the route. An estimated driving condition may be a driving condition for a road segment for the present or historical time, and a predicted driving condition may be a driving condition for a road segment for a future time interval. Alternatively, driving conditions may be considered to be estimated also for future time intervals, and "estimated driving condition" will be used herein for both the current time and for future time intervals.

Thus a route may be selected for an automated vehicle, such that the vehicle can reach destination 120 while respecting, for the entire duration of the trip, its driving condition restriction(s). Automated vehicles may be configured to stop, in case they determine that the prevailing driving conditions are not compliant with the driving condition restriction(s) of the vehicle. Stopped vehicles reduce the effective utilization rate of the fleet, wherefore it is advantageous if the vehicles may be maintained in motion.

For example, as noted, an estimated driving condition may be determined for each one of a plurality of road segments, each driving condition being determined for a specific time interval. Road segments may be thus associated with a series of estimated driving conditions extending from the present time to the future. This determining may be based on at least one of: sensor data items obtained from plural sensors, weather forecasting and information received from third parties. Such sensors may be stationary and/or mobile, in particular, some of the sensors may be fixedly installed at or near a road segment. For example, a sensor installed at a road segment may measure an intensity of ambient light, or air humidity. Likewise, a fixedly installed sensor may be configured to determine, if a road surface at a road segment is wet or if a road segment is congested, or populated by many pedestrians. For example, a sensor may produce sensor data items which comprise indications of at least one of the following: a rainfall intensity, a snowfall intensity, an intensity of ambient light, air pressure, air humidity, wetness of a road surface, a depth of snow on a road surface, road icing, a traffic congestion state, telecommunications connectivity and legibility of lane markings.

Alternatively to being fixedly attached, a sensor may be mobile, in particular a sensor may be attached to a vehicle which moves in the road network, on a drone or installed in a satellite in orbit. Advantageously sensors are installed in automated vehicles of the same fleet of automated vehicles, but sensors may be installed in a wide range of different vehicles, which are configured to provide sensor data items originating in these sensors to the estimated driving condition determination process. One example of sensors are sensors installed on snow plows which clear snow from a road surface. While the surface is free of snow immediately after plowing, in case snowfall continues, snow will accumulate on the road surface after the plow has moved on. The rate of snowfall may be estimated for this purpose from a weather model.

To determine an estimated driving condition for a road segment for a specific time interval, sensor data items and/or items of supplementary information relevant to both the road segment and time interval may be collected. In determining the estimated driving condition, sensor data items which originate nearer to the road segment may be assigned a larger weight, and sensor data items originating further away from the road segment may be assigned a smaller weight, since data from nearer the road segment is more dependably descriptive of conditions at the road segment. In determining the estimated driving condition, sensor data items which have been obtained more recently could be given greater weight than sensor data items which have been obtained a longer time ago. Sensor data items have sensors as their source, while items of supplementary information may have other sources such as cellular operators and third parties, as described herein. This is so, since older data is less dependably descriptive of current or future conditions. The estimated driving conditions may be continually determined, for example in real time, or they may be re-determined once per second, or once per ten seconds, or once per minute, for example. Likewise supplementary information rated as more dependable may be given a larger weight than supplementary information from less reliable sources. The sensor data items and/or items of supplementary information may then undergo weighted linear combination using the weights selected, for example. This enables rapidly responding and adjusting to changing driving conditions in different parts of the road network.

Sensor data items may be considered irrelevant to a given road segment or to a given time interval in case they precede the time interval by more than a threshold time interval, and/or in case they originate from a location that is further away from the road segment than a threshold distance. The driving condition for a road segment at a specific time interval may comprise plural aspects of conditions, for example, it may comprise rainfall intensity, ambient light intensity and traffic congestion. Not all determined driving conditions need to have the same aspects, rather, the aspects present may reflect the available sensor data items and/or the driving condition restrictions present in the automated vehicle(s) to be scheduled.

There are several different ways to combine the sensor data items to arrive at the estimated driving condition, such as a weighted sum of the data contained in the relevant sensor data items. The exact data fusion technique used may vary depending on the driving condition aspect of interest. Another example is to employ estimated recovery times, for example, road segments may have associated with them typical drying times, which may be employed to estimate when the road segment will be dry following cessation of rainfall. Likewise, a system determining the estimated driving conditions may know the times of sunset and sunrise at the road segments, enabling it to predict when darkness will fall, at least to unlit road segments. Similarly, a system may include mapping data which includes location of street lights as well as information on the street lights, e.g., when they turn on/off, if a light is damaged or not working, etc. The further away sensor data items have been generated from a road segment, and the longer in the past they have been generated, the more uncertain their information may be in estimating an aspect of driving condition at a set road segment and time interval. For example, for each road segment within the defined road network, each aspect of driving condition may be measured, or predicted at an earlier stage of the modelling, at time t, and modelled from time t to t+n by weighting the most recently measured value with a model output for each time increment.

As noted above, in addition to sensor data items, the determining of the estimated driving conditions for the road segments may be based on items of supplementary information. Examples of supplementary information include a weather forecast, a rain radar output, cellular network subscriber location information, scheduled mass gathering information and a forest fire warning. For example, a rain radar may very accurately determine a location and intensity of rainfall, enabling rapid updating and, to an extent, predicting, of rainfall in road segments. Cellular network subscriber location information and schedules of mass gatherings, such as concerts, are usable in predicting an increased pedestrian density as well as increased strains on telecommunications bandwidth, which may be difficult for an automated vehicle to safely navigate or to maintain a level of connectivity required in a driving condition restriction. Automated vehicles may be given routes which avoid areas congested with pedestrians or expected strains in telecommunications bandwidth. For example, a vehicle may have a driving mode wherein a driving condition restriction defines that a cellular data connection of at least a certain quality or type must be available. Examples of suitable high-quality cellular data connection types are 4G and 5G connections, as defined by the 3rd generation partnership project, 3GPP.

In some embodiments, the shortest suitable route is selected for a specific automated vehicle. For example, in case road segments 10A and 10D of FIG. 1 have driving conditions, at the appropriate times, which contravene driving condition restrictions of a specific automated vehicle, this vehicle may be routed to destination 120 along a route comprising road segments 10C, 10E, 10F and 10H. Although this is not the shortest route overall, it is at the relevant time(s) the shortest route suitable for that automated vehicle, due to its driving condition restrictions.

In some embodiments, a vehicle is sent along a route, with instructions to proceed to an end of a specific road segment and to wait there for driving conditions to improve in the next road segment, which has driving conditions which infringe restrictions of the vehicle, before continuing to the next road segment. For example, the vehicle may be configured with instructions to stop specifically at an electric-vehicle charging station to charge while waiting, or at a specific, safe stopping point. During a stop, the vehicle may switch to a different driving mode with differing driving condition restrictions, to enable the vehicle to proceed along its journey into the next road segment. An example of a differing driving mode is one with a lower configured top speed, which may be associated with less restrictive driving condition restrictions.

Figure 2:
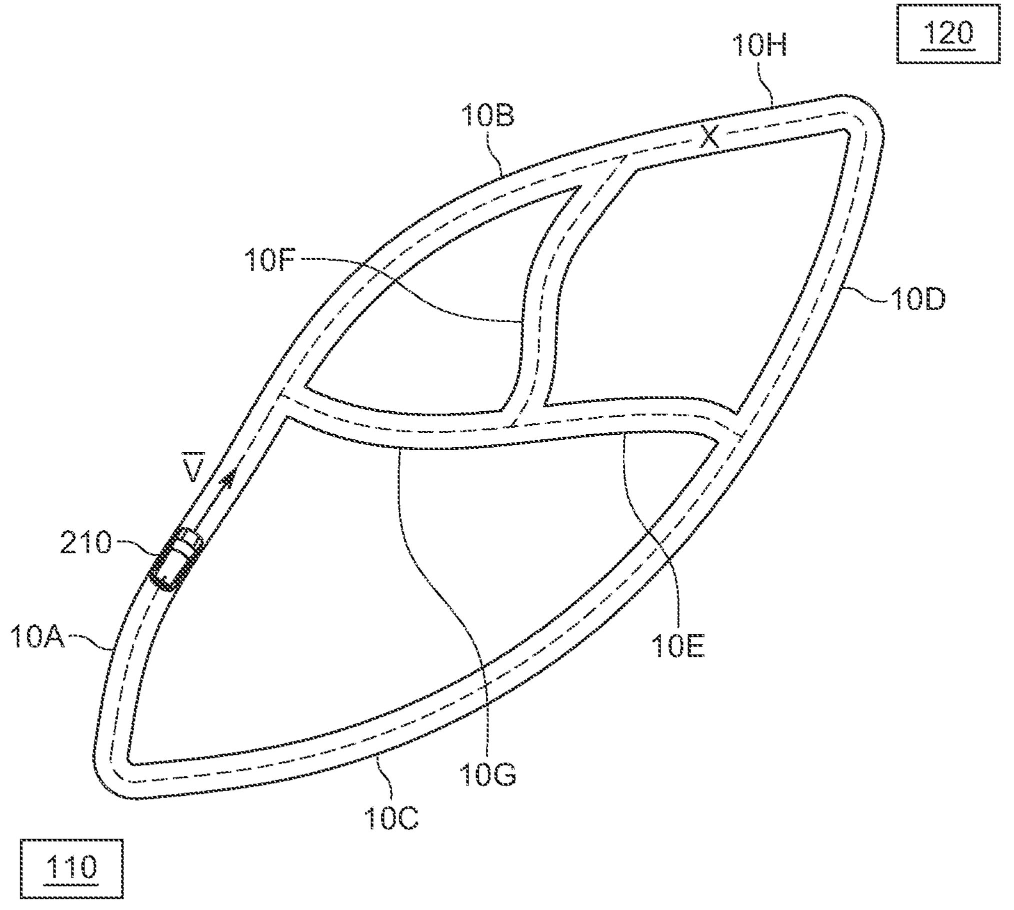
FIG. 2 illustrates an example scenario for illustrating at least some embodiments of the present disclosure.

FIG. 2 illustrates an example scenario for illustrating at least some embodiments of the present disclosure. Like numbering denotes like structure as in FIG. 1. FIG. 2 illustrates a dynamic re-routing scenario. Estimated driving conditions for road segments may be continuously or periodically calculated and re-calculated. Estimated driving conditions for road segments may be regularly calculated at time intervals. New driving conditions for road segments may be determined and/or existing driving condition estimations may be updated and/or verified.

In FIG. 2, automated vehicle 210 is traversing a route comprising consecutive road segments 10A and 10B. When vehicle 210 started from start point 110, road segments 10A, 10B and 10H had driving conditions compliant with the driving condition restrictions of vehicle 210. However, as vehicle 210 is traversing road segment 10A, a new estimate for driving conditions of road segment 10B is determined, according to which driving conditions at this road segment will infringe the driving condition restrictions of vehicle 210 at a time, when the vehicle will, based on its progress speed v, be present in road segment 10B.

To avoid infringement of the driving condition restrictions, vehicle 210 may be dynamically re-routed while it is traversing its original route, so as to avoid the road segment with driving conditions vehicle 210 may not enter into. In the example of FIG. 2, the original route comprising road segments 10A, 10B and 10H may be replaced with a longer route comprising, in order, road segments 10A, 10G, 10E and 10D. Thus vehicle 210 would not enter road segment 10B, and it could continue moving toward destination 120 without stopping. Alternatively to re-routing to a longer route, vehicle 210 may be caused to stop for re-charging at a charging station to wait for driving conditions in the road segment to improve. As the vehicle may need to be re-charged in any case, there are situations where stopping to charge does not materially reduce a utilization rate. This applies in particular, where the estimated driving conditions of the road segment indicate that in the relatively near future, driving conditions in the road segment will improve.

Another way to avoid infringement of the driving condition restriction is to reduce a speed v at which vehicle 210 moves, in case it is foreseen that the driving conditions at road segment 10B will resolve to such an extent, that they no longer infringe the driving condition restriction of vehicle 210 when the vehicle enters road segment 10B, using the lowered speed. This may apply to an average speed, or to a maximum speed. One manner of reducing an average speed is to take longer stops behind stop signs in situations where there is no vehicle behind the vehicle 210. A similar effect may be achieved by starting from traffic lights with a delay in case there are no cars behind vehicle 210. In this case, the route is not lengthened, even though travel time increases. In case the driving conditions are not suitable when the vehicle arrives at the start of road segment 10B, it may be configured to park at a safe spot to wait for the conditions to improve, before continuing its journey along road segment 10B. The vehicle may be configured to perform a pre-configured minimum risk maneuver, such as a gradual stop. In some cases, it may likewise be possible to increase a speed of a vehicle, to enable it to traverse a road segment before its driving conditions deteriorate to a point where they infringe the vehicle's driving condition restriction.

In some embodiments, an automated vehicle, while driving along a route comprised of road segments, is configured to not pass a defined location, unless there is sufficient confidence based on the estimated driving conditions of road segments, that driving conditions until a next safe park spot do not infringe driving condition restrictions of the vehicle. The confidence may be a numerical value, derived from the data items, such as sensor data items and/or items of supplementary information, used to derive the estimated driving condition(s) for the next road segment(s). For example, an estimated driving condition derived from less dependable data items, corresponding for example to lower weights assigned to these data items, may have a lower confidence value than an estimated driving condition derived from more reliable sensor data items and/or items of supplementary information.

While discussed herein primarily in terms of roads divided into road segments which are fixed in nature, in some embodiments of the present disclosure the road segments may be dynamically determined. In particular, a road segment may be defined as a fixed distance, such as 500 metres or two kilometres, in front of a vehicle, to enable easy determining whether the vehicle should stop—in case this dynamic road segment is determined to have driving conditions which are disallowed in the vehicle's driving condition restriction. Such dynamic road segments may be determined in addition to fixed road segments, even if they overlap with each other. In some cases, the road network may be subdivided into the road segments in different ways for different types of automated vehicles—in particular, electric vehicles may have a segmenting into road segments which takes into account charging points, while combustion-engine powered automated vehicles may have segmenting which ignored electric charging points.

The scheduling may comprise route planning and assigning a vehicle to the planned route. For example, route planning may comprise choosing a specific path, or set of road segments, to form the entire route. It may be the case, that only one route exists or can reasonably be expected to be used. Assigning a vehicle to the route comprises selecting a vehicle to traverse the route. As the route is planned using an driving condition restriction, the vehicle may be chosen from a set of vehicles which share the same driving condition restriction. Scheduling may also be broken down into a macro and micro level. At the macro level scheduling comprises when to leave point A, when to stop, when to charge electrical charge, when to restart and/or in what time window to arrive at the destination. At the micro level scheduling comprises maximum speed in a road segment or along even a whole route, and/or when to conditionally speed up or slow down. The micro level of scheduling may also comprise when to conditionally increase or decrease parameters such as braking distance or following distance. Further, scheduling may take place at a mode level. For example, a vehicle can be scheduled to leave place A at a specific time fully autonomously and then at location B, and/or at a second specific time to change to a supervised autonomous driving mode. Scheduling may also comprise that at some point, or time, a system is likely to be disabled, so places where the vehicle can pull over, slow down or be assigned supervision or control by a remote vehicle operator are scheduled.

In general, one aspect of at least some embodiments of the present disclosure is that stopping of vehicles can be scheduled more effectively. For instance, if the vehicle is on a route and a road segment it is expected to traverse is predicted to not be optimal (for example, it may be incompatible with the vehicle's driving condition restriction) then a stop (for example a charging stop for an electric vehicle) may be added where there is a good stopping point, prior to encountering the road segment which would actually force the vehicle to stop. In this case the utilization of the vehicle is not increased as such, but the location of stopping is optimized for safety and/or charging. For example, if a road segment has no shoulder and a vehicle would need to stop on that segment due to a change in driving conditions then it would need to stop in the middle of the road. To avoid this that road segment can be scheduled, included in a route, when it is reasonably expected that the whole road segment can be traversed in acceptable conditions. There may be a weighting function employed, so that the level of certainty, or the width of a time window of accepted predicted conditions, is higher than on a road segment where the vehicle can pull over safely at any spot when the driving conditions change.

Figure 3:
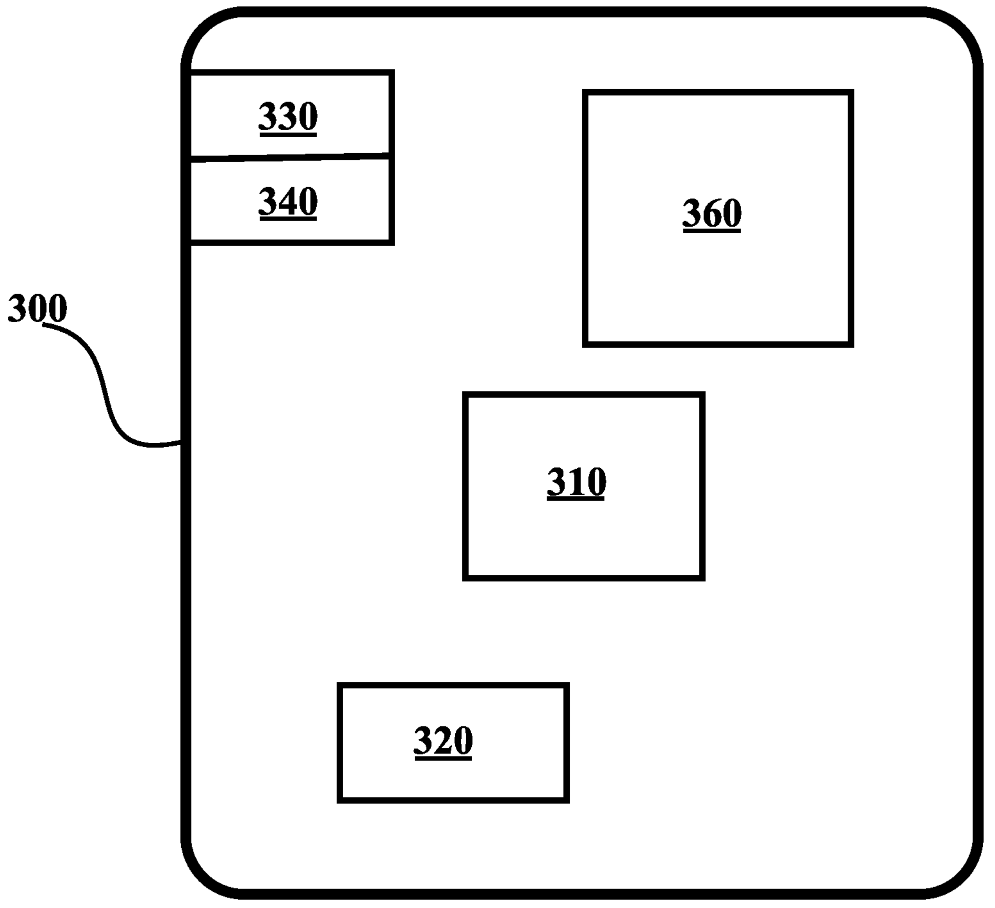
FIG. 3 illustrates an example apparatus capable of supporting at least some embodiments of the present disclosure.

FIG. 3 illustrates an example apparatus capable of supporting at least some embodiments of the present disclosure. Illustrated is device 300, which may comprise, for example, a computing device configured to determine driving conditions and/or schedule automated vehicles. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. When processor 310 comprises more than one processor, device 300 may be a distributed device wherein processing of tasks takes place in more than one physical unit. Processor 310 may be a control device. A processing core may comprise, for example, a Cortex-A8 processing core manufactured by ARM Holdings or a Zen processing core designed by Advanced Micro Devices Corporation. Processor 310 may comprise at least one AMD Opteron and/or Intel Xeon processor. Processor 310 may comprise at least one application-specific integrated circuit, ASIC. Processor 310 may comprise at least one field-programmable gate array, FPGA. Processor 310 may be means for performing method steps in device 300, such as obtaining, determining, or employing. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300. Memory 320 may be non-transitory.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with fibre optic, wideband code division multiple access, WCDMA, 5G, long term evolution, LTE, wireless local area network, WLAN, Ethernet and/or worldwide interoperability for microwave access, WiMAX, standards, for example.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to configure vehicle fleet scheduling parameters.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. In some embodiments, device 300 lacks at least one device described above. Processor 310, memory 320, transmitter 330, receiver 340 and/or UI 360 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present disclosure.

Device 300 may be installed, or configured to be installed, in a vehicle, for example, to at least in part control the functioning of the vehicle. Alternatively, the device may form part of a server or another type of computing substrate, such as a cloud computing solution, computing grid or corporate datacentre.

Figure 4A:
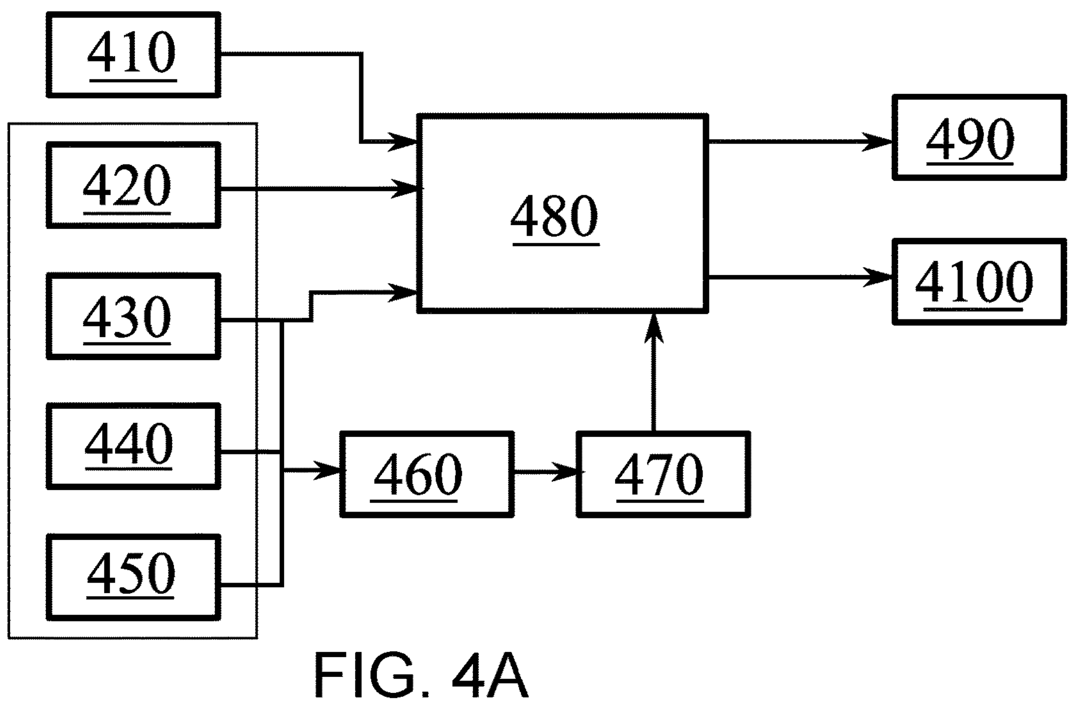
FIG. 4A illustrates an example scheduling process in accordance with at least some embodiments of the present disclosure.

FIG. 4A illustrates an example scheduling process in accordance with at least some embodiments of the present disclosure. A transport need 410 is input to scheduler 480. A transport need may be a need of transporting a cargo of certain specifications, such as weight, shape and dimensions, from a start point to a destination. Alternatively or in addition, a transport need may comprise a need to move a vehicle from a start point to a destination, as part of fleet scheduling. A list of assets 420, such as automated vehicles, a set of road segments 430 forming a road network, driving condition relevant sensor data items 440 and driving condition models 450 form a state. As discussed herein above, vehicles with automated functionality may have associated driving condition restrictions, and one vehicle may have different driving modes with different associated sets of driving condition restrictions. In other words, a state comprises the assets, 420, road segments 430, sensor data items 440 and models 450. Models 450 may comprise models defining how quickly a road segment dries and other dynamic modelling data. In addition to models 450 and sensor data items 440, also supplementary information may be provided for predicting driving conditions, as described herein above.

An estimated driving condition determiner 460 may take inputs, as described herein above, from the list of road segments 430, sensor data items 440 models 450 and/or supplementary information, to determine estimated driving conditions 470 for road segments for specific time intervals. Scheduler 480 takes as inputs, for example, the estimated driving conditions, and outputs scheduling decisions 490 for the vehicles, and, optionally, predicted states 4100. The estimated driving condition determination and scheduling may be performed centrally for one or more fleets of automated vehicles. The process can also be split between different systems and locations. For example, a driving condition determiner 460 may be located in one system which is separate from a scheduler. Similarly, assets, information, models, sensor data and other data may be collected, manipulated, stored, processed or otherwise handled in one or more separate systems with one or more outputs accessible by a driving condition determiner or intermediary system. An estimated driving condition determination and scheduling apparatus may provide scheduling decisions for fleets of automated vehicles which traverse different road networks, possible even in different countries.

Figure 4B:
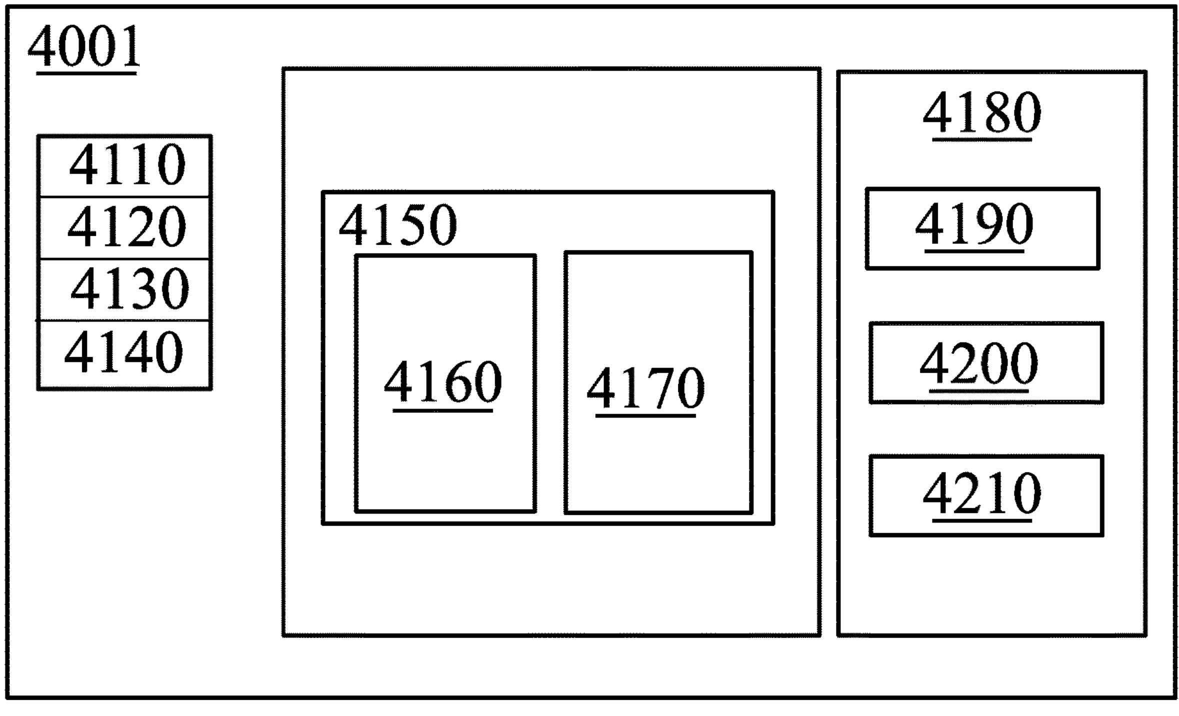
FIG. 4B illustrates an example state in accordance with at least some embodiments of the present disclosure.

FIG. 4B illustrates an example state in accordance with at least some embodiments of the present disclosure. State 4001 comprises, on the left, assets in the form of trailers 4110, automated vehicles 4120, electric chargers 4130 for the vehicles and human operators 4140.

Further, state 4001 comprises information elements describing the road network, or road networks where different fleets are scheduled for different road networks. In detail, each road segment 4150 comprises a slowly varying driving condition part 4160 and a fast-varying driving condition part 4170. Part 4160 may comprise, for example, information on driving lanes, intersections, roundabouts, traffic signs, speed limits, static environmental obstacles and road surface types. Part 4170, on the other hand, may comprise indications on precipitation speed, for example expressed as millimetres per hour. Further, part 4170 may comprise information on precipitation type, for example rain, sleet or snow, wind speed, temperature, non-permanent road blockages (e.g., crashes), traffic flow speed, available wireless connectivity types and available wireless bandwidth. In addition to slowly varying driving condition part 4160 and fast-varying driving condition part 4170, state 4001 may further include a static part, which may contain information on road segments that does not change, e.g. numbers of lanes, speed limits, how tight curves the road segments include and/or permanent visibility obstacles.

Inputs 4180 comprise a set of mobile sensors 4190, such as vehicle-mounted sensors, and a set of static sensors 4200, such as traffic cameras, road surface temperature sensors and other statically installed traffic flow sensors. Further, supplementary information sources 4210 may comprise, for example, weather forecasts, rainfall radar, cellular network subscriber location information and/or a mass gathering calendar.

FIG. 5 is a flow graph of a method in accordance with at least some embodiments of the present disclosure. The phases of the illustrated method may be performed in vehicle scheduling computer, for example, or in a control device configured to control the functioning thereof, when installed therein.

Phase 510 comprises obtaining plural data items originating in plural distinct sources. Phase 520 comprises determining, based at least in part on the data items, at least one estimated driving condition for each one of a plurality of road segments in a road network, each driving condition being determined for a future time interval. Phase 530 comprises determining at least one route in the road network for the vehicle which includes a first road segment with a first estimated driving condition, determined for a first time interval, from among the at least one estimated driving condition, which meets the driving condition restriction for the at least partially automated mode of the vehicle. Finally, phase 540 comprises scheduling the vehicle on the road network using at least one of the at least one determined route such that the vehicle traverses the first road segment at the first time interval.

It is to be understood that the embodiments of the present disclosure described are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present disclosure. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present disclosure may be referred to herein along with alternatives for the various components thereof. It is understood that such embodiments, examples, and alternatives are not to be construed as de facto equivalents of one another but are to be considered as separate and automated representations of the present disclosure.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the present disclosure. One skilled in the relevant art will recognize, however, that the embodiments of the present disclosure can be practiced without one or more of the specific details, or with other methods, components, materials, etc. In other instances, well-known structures, materials, or operations are not shown or described in detail to avoid obscuring aspects of the present disclosure.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in dependent claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present disclosure find industrial application in automated vehicle management.

What is claimed is:

1. A computer implemented method for route planning for a vehicle with automated driving capabilities, the computer implemented method comprising:

obtaining a driving condition restriction for an automated system or automated feature of the vehicle which defines at least one set of acceptable conditions for operating the vehicle in an at least partially automated mode;

obtaining plural data items originating in plural distinct sources;

determining, based at least in part on the plural data items, at least one estimated driving condition for each one of a plurality of road segments in a road network, wherein:

each of the at least one estimated driving condition being determined for a future time interval; and the at least one estimated driving condition includes a telecommunication connectivity quality or type for the each one of the plurality of road segments in the road network; and determining at least one route in the road network for the vehicle which includes a first road segment with a first estimated driving condition, determined for a first time interval, which satisfies the driving condition restriction for the at least partially automated mode of the vehicle, wherein the first estimated driving condition includes the telecommunication connectivity quality or type being at least a predetermined quality or type; and scheduling instructions for the vehicle including the at least one determined route such that the vehicle is capable of traversing the first road segment during the first time interval, wherein the scheduling further comprises adjusting a travelling speed, a start time, an arrival time, a stopping time, a stopping duration and/or a charging time for the vehicle for a portion of the determined at least one route so that the vehicle will be scheduled to arrive at a predetermined road segment within a time interval where the vehicle can be expected to traverse the whole predetermined road segment with determined driving conditions which meet the driving condition restriction of the vehicle.

2. The computer implemented method according to claim 1, wherein scheduling the instructions for the vehicle further comprises scheduling the vehicle to drive a first determined route from among the at least one route such that the vehicle may traverse the entire first route during a time when the estimated driving conditions of all road segments of the first route, at the times the vehicle is scheduled to be on the road segments, meet the driving condition restriction for the automated system or automated feature of the vehicle.

3. The computer implemented method according to claim 1, wherein the scheduling further comprises modifying the at least one determined route, or scheduled driving time of a road segment of the at least one determined route after the vehicle has started traversing the at least one determined route to avoid a determined road segment which has a determined driving condition which is not expected to meet the driving condition restriction at an expected time the vehicle was, before the modifying, scheduled to traverse the determined road segment.

4. The computer implemented method according to claim 1, wherein the plural data items include indications of at least one of the following: a rainfall intensity, a snowfall intensity, an intensity of ambient light, air pressure, air humidity, wetness of a road surface, a depth of snow on a road surface, road icing, a traffic congestion state and legibility of lane markings, expected telecommunications connectivity, satellite-based navigation coverage, network bandwidth availability, road illumination state and road surface temperature.

5. The computer implemented method according to claim 1, wherein the determining of the at least one estimated driving condition is based, at least in part, on supplementary information in addition to sensor data items, wherein the supplementary information includes at least one of the following: a weather forecast, a rain radar, cellular network subscriber location information, scheduled mass gathering information, topological map information, and a forest fire warning.

6. A road transport system for route planning for a vehicle with automated driving capabilities, the road transport system comprising:

a control system comprising at least one processor configured to:

obtain a driving condition restriction for an automated system or automated feature of the vehicle which defines at least one set of acceptable conditions for operating the vehicle in an at least partially automated mode;

obtain plural data items originating in plural distinct sources;

determine, based at least in part on the plural data items, at least one estimated driving condition for each one of a plurality of road segments in a road network, wherein:

each of the at least one estimated driving condition being determined for a future time interval; and the at least one estimated driving condition includes a telecommunication connectivity quality or type for the each one of the plurality of road segments in the road network; and determine at least one route in the road network for the vehicle which includes a first road segment with a first estimated driving condition, determined for a first time interval, which satisfies the driving condition restriction for the at least partially automated mode of the vehicle, wherein the first estimated driving condition includes the telecommunication connectivity quality or type being at least a predetermined quality or type; and schedule instructions for the vehicle including the at least one determined route such that the vehicle is capable of traversing the first road segment during the first time interval, wherein in scheduling instructions for the vehicle, the at least one processor is configured to adjust a travelling speed, a start time, an arrival time, a stopping time, a stopping duration and/or a charging time for the vehicle for a portion of the determined at least one route so that the vehicle will be scheduled to arrive at a predetermined road segment within a time interval where the vehicle can be expected to traverse the whole predetermined road segment with determined driving conditions which meet the driving condition restriction of the vehicle.

7. The road transport system according to claim 6, wherein in scheduling instructions for the vehicle, the at least one processor is configured to schedule the vehicle to drive a first determined route from among the at least one route such that the vehicle may traverse the entire first route during a time when the estimated driving conditions of all the road segments of the first route, at the times the vehicle is scheduled to be on the road segments, meet the driving condition restriction for the automated system or automated feature of the vehicle.

8. The road transport system according to claim 6, wherein in scheduling instructions for the vehicle, the at least one processor is configured to modify the at least one determined route, or scheduled driving time of a road segment of the at least one determined route after the vehicle has started traversing the at least one determined route to avoid a determined road segment which has a determined driving condition which is not expected to meet the driving condition restriction at an expected time the vehicle was, before the modifying, scheduled to traverse the determined road segment.

9. The road transport system according to claim 6, wherein the plural data items include indications of at least one of the following: a rainfall intensity, a snowfall intensity, an intensity of ambient light, air pressure, air humidity, wetness of a road surface, a depth of snow on a road surface, road icing, a traffic congestion state and legibility of lane markings, expected telecommunications connectivity, satellite-based navigation coverage, network bandwidth availability, road illumination state and road surface temperature.

10. The road transport system according to claim 6, wherein in determining the at least one estimated driving condition, the at least one processor is configured to determine the at least one estimated driving condition based, at least in part, on supplementary information in addition to sensor data items, wherein the supplementary information includes at least one of the following: a weather forecast, a rain radar, cellular network subscriber location information, scheduled mass gathering information, topological map information, and a forest fire warning.

11. The road transport system according to claim 6, wherein the driving condition restriction includes a first set of driving condition restrictions defined for the vehicle for a first type of road, and a second set of driving condition restrictions defined for the vehicle for a second type of road.

12. The road transport system of claim 6, further comprising:

a fleet of automated vehicles, wherein:

the fleet of automated vehicles comprise sensors and are configured to transmit sensor data items to the control system, the sensor data items being included in the plural data items; and the at least one processor is configured to determine the at least one estimated driving condition, based at least in part on the sensor data items received from the fleet of automated vehicles, for the each one of the plurality of road segments.

13. A non-transitory computer readable medium having stored thereon a set of computer readable instructions for route planning for a vehicle with automated driving capabilities, where the set of computer readable instructions, when executed by at least one processor, cause the at least one processor to at least:

obtain a driving condition restriction for an automated system or automated feature of the vehicle which defines at least one set of acceptable conditions for operating the vehicle in an at least partially automated mode;

obtain plural data items originating in plural distinct sources;

determine, based at least in part on the plural data items, at least one estimated driving condition for each one of a plurality of road segments in a road network, wherein:

each of the at least one estimated driving condition being determined for a future time interval; and the at least one estimated driving condition includes a telecommunication connectivity quality or type for the each one of the plurality of road segments in the road network; and determine at least one route in the road network for the vehicle which includes a first road segment with a first estimated driving condition, determined for a first time interval, which satisfies the driving condition restriction for the at least partially automated mode of the vehicle, wherein the first estimated driving condition includes the telecommunication connectivity quality or type being at least a predetermined quality or type; and schedule instructions for the vehicle including the at least one determined route such that the vehicle is capable of traversing the first road segment during the first time interval, wherein in scheduling instructions for the vehicle, modify the at least one determined route, or scheduled driving time of a road segment of the at least one determined route after the vehicle has started traversing the at least one determined route to avoid a determined road segment which has a determined driving condition which is not expected to meet the driving condition restriction at an expected time the vehicle was, before the modifying, scheduled to traverse the determined road segment.

14. The non-transitory computer readable medium according to claim 13, where the set of computer readable instructions, when executed by the at least one processor, cause the at least one processor to:

in scheduling instructions for the vehicle, schedule the vehicle to drive a first determined route from among the at least one route such that the vehicle may traverse the entire first route during a time when the estimated driving conditions of all the road segments of the first route, at the times the vehicle is scheduled to be on the road segments, meet the driving condition restriction for the automated system or automated feature of the vehicle.

15. The non-transitory computer readable medium according to claim 13, where the set of computer readable instructions, when executed by the at least one processor, cause the at least one processor to:

wherein in scheduling instructions for the vehicle, adjust a travelling speed, a start time, an arrival time, a stopping time, a stopping duration and/or a charging time for the vehicle for a portion of the determined at least one route so that the vehicle will be scheduled to arrive at a predetermined road segment within a time interval where the vehicle can be expected to traverse the whole predetermined road segment with determined driving conditions which meet the driving condition restriction of the vehicle.

16. The non-transitory computer readable medium according to claim 13, wherein the plural data items include indications of at least one of the following: a rainfall intensity, a snowfall intensity, an intensity of ambient light, air pressure, air humidity, wetness of a road surface, a depth of snow on a road surface, road icing, a traffic congestion state and legibility of lane markings, expected telecommunications connectivity, satellite-based navigation coverage, network bandwidth availability, road illumination state and road surface temperature.

17. The non-transitory computer readable medium according to claim 13, where the set of computer readable instructions, when executed by the at least one processor, cause the at least one processor to:

in determining the at least one estimated driving condition, determine the at least one estimated driving condition based, at least in part, on supplementary information in addition to sensor data items, wherein the supplementary information includes at least one of the following: a weather forecast, a rain radar, cellular network subscriber location information, scheduled mass gathering information, topological map information, and a forest fire warning.

* * * * *